(12) United States Patent
Hollinger

(10) Patent No.: US 10,941,914 B1
(45) Date of Patent: Mar. 9, 2021

(54) SOLAR LED LAMP WITH FLAME EFFECT AND REMOTE CONTROL

(71) Applicant: E. MISHAN & SONS, INC., New York, NY (US)

(72) Inventor: Fred Hollinger, Monroe Township, NJ (US)

(73) Assignee: E. Mishan & Sons, Inc., New York, NY (US)

(*) Notice: Subject to any disclaimer, the term of this patent is extended or adjusted under 35 U.S.C. 154(b) by 0 days.

(21) Appl. No.: 17/061,000

(22) Filed: Oct. 1, 2020

Related U.S. Application Data

(63) Continuation-in-part of application No. 16/872,890, filed on May 12, 2020.

(60) Provisional application No. 62/949,061, filed on Dec. 17, 2019.

(51) Int. Cl.
| | |
|---|---|
| F21S 10/04 | (2006.01) |
| F21S 9/03 | (2006.01) |
| H05B 47/19 | (2020.01) |
| H05B 47/17 | (2020.01) |
| H05B 45/20 | (2020.01) |
| F21Y 115/10 | (2016.01) |

(52) U.S. Cl.
CPC ............ *F21S 10/043* (2013.01); *F21S 9/037* (2013.01); *H05B 45/20* (2020.01); *H05B 47/17* (2020.01); *H05B 47/19* (2020.01); *F21Y 2115/10* (2016.08)

(58) Field of Classification Search
None
See application file for complete search history.

(56) References Cited

U.S. PATENT DOCUMENTS

| | | |
|---|---|---|
| 5,924,784 A | 7/1999 | Chliwnyj |
| 6,616,308 B2 | 9/2003 | Jensen |
| 6,688,752 B2 | 2/2004 | Moore |
| 6,926,423 B2 | 8/2005 | Bucher |
| 7,201,500 B2 | 4/2007 | Mishan |
| 7,261,455 B2 | 8/2007 | Schnuckle |
| 8,721,118 B2 | 5/2014 | Patton |
| 9,341,342 B2 | 5/2016 | Chiang |
| 9,689,544 B2 | 6/2017 | Green |
| 9,739,432 B2 | 8/2017 | Li |
| 9,810,388 B1 | 11/2017 | Li |
| 9,857,039 B2 | 1/2018 | Jagt |

(Continued)

*Primary Examiner* — Ashok Patel
(74) *Attorney, Agent, or Firm* — Notaro, Michalos & Zaccaria P.C.

(57) ABSTRACT

A lamp for illumination or decorative lighting having a lamp unit with a roof portion and a base portion, and a translucent cylindrical enclosure. A single, flat, and rigid PCB is disposed within the enclosure, mounted to the roof portion. A white set of LEDs is mounted on the faces of the PCB and arranged in a plurality of white rows. A colored set of LEDs is mounted on the two faces and arranged in a plurality of colored rows, the white rows interleaved with the colored rows. A battery rechargeable by solar cell powers the LEDs. A switch and electronic circuitry selectively control the white set and colored set, the circuitry configured to perform an off mode (white set and colored set are off), an illumination mode (white set is powered on continuously and the colored set is off), and a flame mode (colored LEDs of the colored set are powered on selectively to simulate a flame), selected by the switch or by a remote control.

12 Claims, 16 Drawing Sheets

(56) References Cited

U.S. PATENT DOCUMENTS

| | | |
|---|---|---|
| 10,125,937 B2 | 11/2018 | Green |
| 10,161,583 B1 | 12/2018 | Stobart |
| 10,344,930 B1 | 7/2019 | Mitchell |
| 10,436,401 B2 | 10/2019 | Lee |
| 10,704,752 B1 | 7/2020 | Zhu |
| 2004/0223326 A1 | 11/2004 | Wainwright |
| 2005/0196716 A1 | 9/2005 | Haab |
| 2013/0033195 A1 | 2/2013 | Liao |
| 2016/0057829 A1 | 2/2016 | Li |
| 2017/0191630 A1 | 7/2017 | Lentine |
| 2020/0091746 A1* | 3/2020 | Chien ................ F21V 33/0004 |

* cited by examiner

SOLAR LED LAMP WITH FLAME EFFECT AND REMOTE CONTROL

CROSS-REFERENCE TO RELATED APPLICATIONS

This application claims priority from U.S. Provisional Patent Application Ser. No. 62/949,061, filed Dec. 17, 2019, the entire disclosure of which is hereby incorporated by reference for all purposes.

This application is also a continuation-in-part of U.S. patent application Ser. No. 16/872,890, filed May 12, 2020, which claims priority from U.S. Provisional Patent Application Ser. No. 62/949,061, filed Dec. 17, 2019, the entire disclosures of which are hereby incorporated by reference for all purposes.

STATEMENT REGARDING PRIOR DISCLOSURES BY THE INVENTORS OR JOINT INVENTORS UNDER 37 C.F.R. 1.77(b)(6)

Solar pathway lights were offered for sale by the applicant/assignee E. Mishan & Sons less than one year before the priority date of the present application, under the name BELL+HOWELL Solar Powered Lights. The applicant/assignee obtained the BELL+HOWELL Solar Powered Lights directly or indirectly from the named inventors of the present application. Said BELL+HOWELL Solar Powered Lights are "inventor-originated disclosures" within the exceptions defined in 35 U.S.C. 102(b)(1).

FIELD AND BACKGROUND OF THE INVENTION

The subject technology relates to lamps for illumination or decorative lighting, or landscape lighting, which may be powered by solar energy collected by solar cells and stored in a rechargeable battery to power light-emitting diodes ("LEDs") to emit light.

SUMMARY OF THE INVENTION

According to an aspect of the subject technology, a decorative lamp comprises one or more printed circuit boards ("PCBs"), preferably one main PCB having LEDs thereon, housed within a housing including a surrounding translucent glass or plastic enclosure which scatters outgoing light while obscuring a clear view of the PCB from outside the enclosure. The main PCB has mounted thereon LEDs to emit light and circuitry to operate and drive the LEDs. Preferably the LEDs include a first set of LEDs emitting white light (as usually used for illumination) and a second set of colored LEDs, which emit colored light, for example, red, yellow or orange light (i.e., colors which suggest a flame), and/or other colors of light. The enclosure may be cylindrical so that the light is visible from a 360-degree perspective around the device. In an embodiment, a three-position switch is provided on the lamp to turn the lamp off in a first position, gate power to the colored LEDs in a second position, and gate power to the white LEDs in a third position. A rechargeable battery is provided in the lamp to power the LEDs and associated circuitry. The rechargeable battery is charged by a solar cell or cells, preferably positioned on the top of the lamp when installed. The solar cell or cells also are used as a light detector, so that the lamp will illuminate only in low-light conditions. This feature enables unattended operation, which is desirable in a landscape light.

According to an embodiment of the subject technology, a lamp for illumination or decorative lighting comprises a lamp unit. The lamp unit comprises a roof portion and a base portion; and a translucent cylindrical enclosure disposed with in the lamp unit. A single, flat, and rigid first circuit board is disposed within the cylindrical enclosure and mounted to the roof portion or the base portion and has two faces. A white set of LEDs for emitting white light is mounted on the two faces and arranged in a plurality of white rows on each of the two faces. A colored set of LEDs for emitting colored light is mounted on the two faces and arranged in a plurality of colored rows on each of the two faces. Preferably the white rows are interleaved with the colored rows. A rechargeable battery power source is provided to power the white set of LEDs and colored set of LEDs. A user-operated switch and electronic circuitry are provided for selectively powering from the battery and controlling the white set of LEDs and colored set of LEDs. The electronic circuitry configured to operate the lamp in a plurality of modes comprising an off mode, an illumination mode, and a flame mode, selected by the switch. When the off mode is selected the white set and colored set are off, when the illumination mode is selected the white set is powered on continuously and the colored set is off, when the flame mode is selected the colored LEDs of the colored set are powered on selectively to simulate a flame.

DETAILED DESCRIPTION OF THE INVENTION

Figure 1:
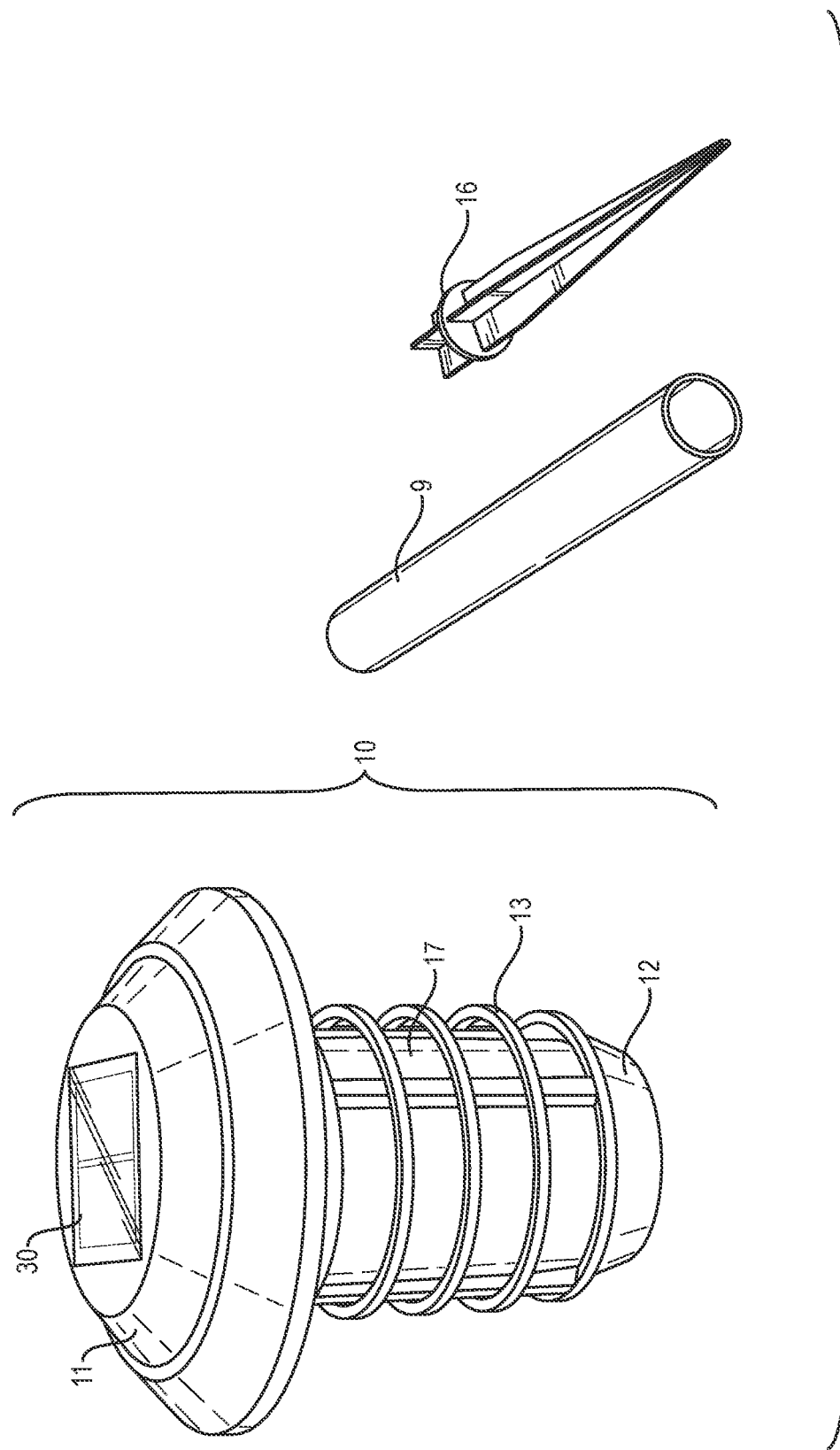
FIG. 1 is a view of the lamp unit alongside a landscape spike for staking the lamp into the ground for use as a landscape light according to an embodiment.

According to a non-limiting aspect of the subject technology, shown for example in FIGS. 1-10, a solar lamp 1 for illumination or decorative lighting, or landscape lighting, includes a lamp unit 10 consisting of a roof portion 11 assembled to a base portion 12, which assembly has the ornamental appearance of a lantern. The roof portion 11, or alternatively the base portion 12, has a cylindrical wall 13 extending to the base portion 12, or alternatively the roof portion 11, the wall 13 having windows 14 therethrough. The base portion 12 optionally includes a socket 15 for receiving a landscape post 9 and spike 16, for staking the lamp 1 into the ground for use as a landscape light.

The components of the lamp unit 10 are housed within the lamp unit (i.e. the assembly of the roof portion 11 and base portion 12). Within the assembly, a glass or plastic cylindrical enclosure 17 surrounds a main printed circuit board ("PCB") 20 and its mounted LEDs and other electrical components. Preferably the enclosure 17 is translucent, but not so transparent that the PCB 20 and the mounted components are visible from outside the lamp unit. The enclosure 17 within the lamp unit 10 has the ornamental appearance of the globe or chimney of a traditional lantern.

Figure 2:
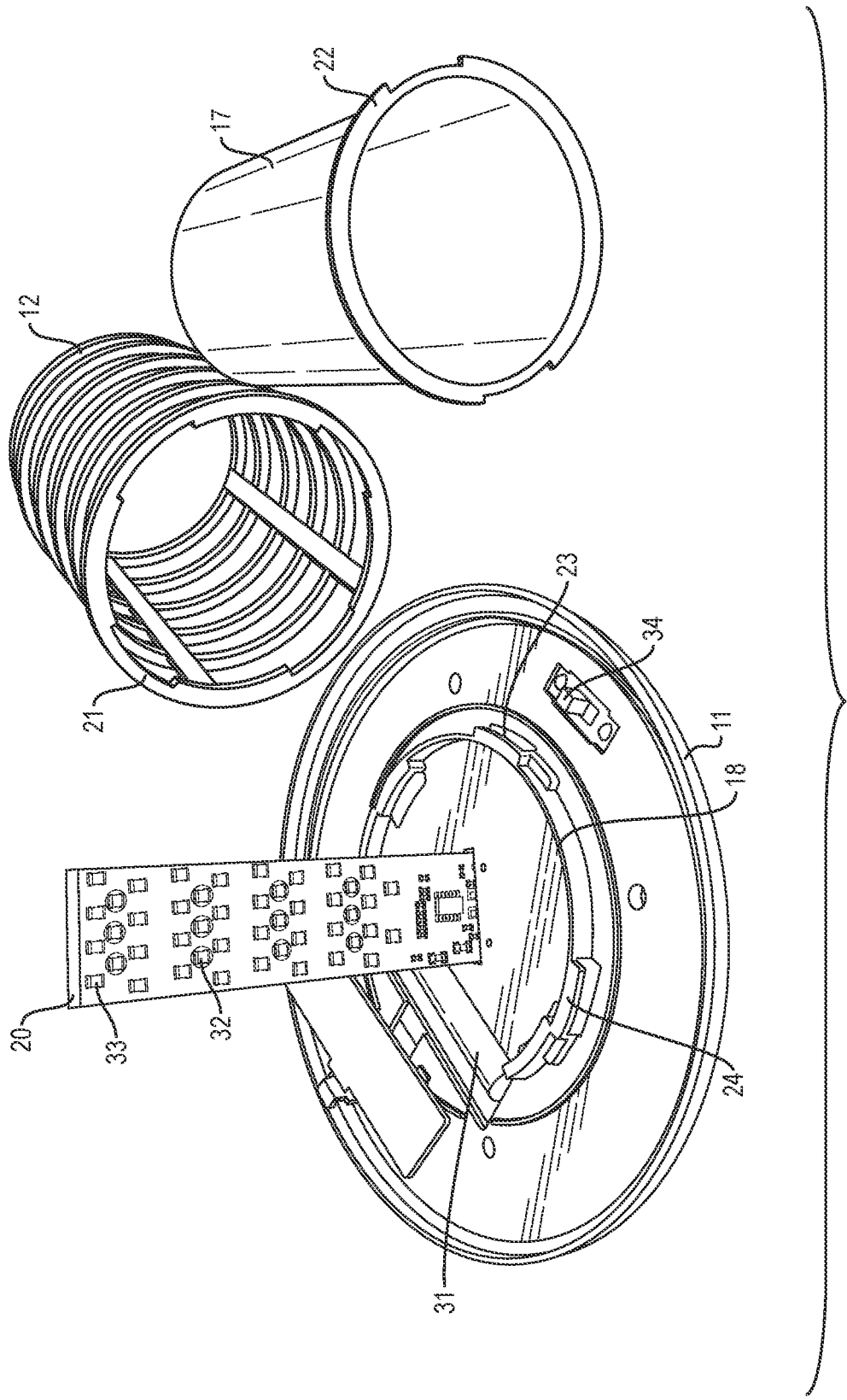
FIG. 2 is a view of the lamp unit in a disassembled state, showing the PCB board and rechargeable battery assembled to the roof portion, alongside the base portion and the enclosure, according to an embodiment.
Figure 3:
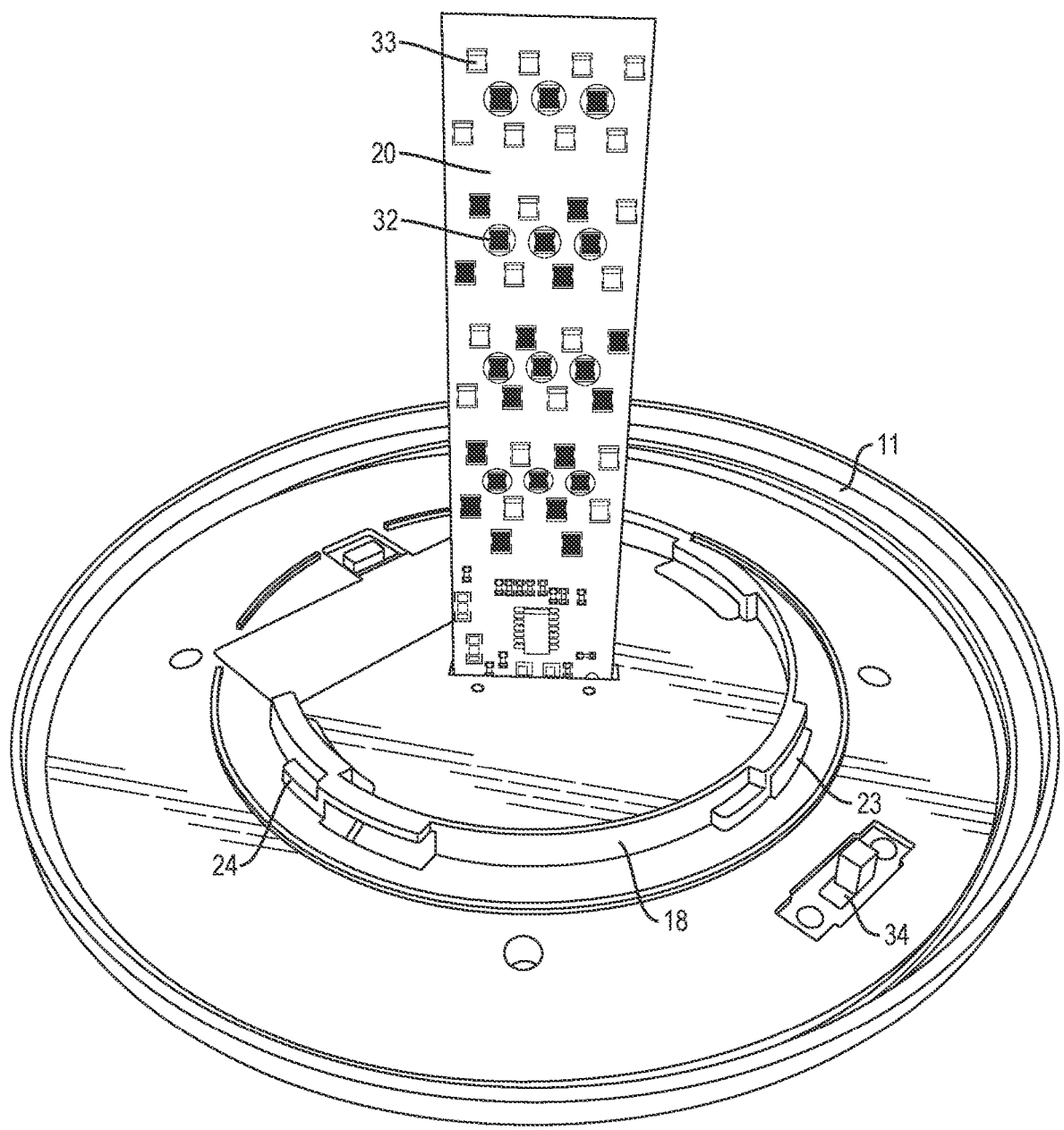
FIG. 3 is a view of the PCB mounted in the roof portion of the lamp unit with colored LEDs illuminated according to an embodiment.

In an embodiment, the roof portion 11 has an annular ridge 18, surrounding the location of the PCB, for removably mounting the base portion 12 and the enclosure 17 to the roof portion. Each of the base portion 12 and enclosure 17 has a rim 21, 22, respectively, which is configured to engage with the ridge 18 and lock into place by rotating the part slightly. The ridge 18 comprises slots 23 (only one is numbered) and tabs 24 (only one is numbered), which engage with corresponding tabs and slots on the respective rims 21, 22, as best seen in FIG. 2. In this embodiment, the base portion rim 21 engages with the outer diameter of the annular ridge 18, and the enclosure rim 22 engages with the inner diameter of the annular ridge 18.

According to an embodiment, a single, flat, rigid, main PCB 20 is mounted to the roof portion 11 or base portion 12, preferably the roof portion 11 which also bears the solar cells 30 and battery 31, so that it extends for a length within the enclosure 17. The PCB 20 has mounted thereon LEDs to emit light, and circuitry to operate and drive the LEDs. Preferably the LEDs include a first set of LEDs 32 (only one is numbered) emitting white light (as usually used for illumination) and a second set of colored LEDs 33 (only one is numbered), which emit colored light, for example, red, yellow or orange light (i.e., colors which suggest a flame), and/or other colors of light. Preferably the LEDs 32, 33 are arranged in arrays on both sides (i.e., both faces) of the PCB 20. The applicants have discovered that a single, flat, rigid, main PCB with LEDs mounted on both sides, within a light-scattering translucent enclosure, is sufficient to give the impression of a flame, so that multiple flat PCBs or a single flexible, curved PCB are not necessary. This results in a simpler, more durable and less-expensive construction.

Figure 4:
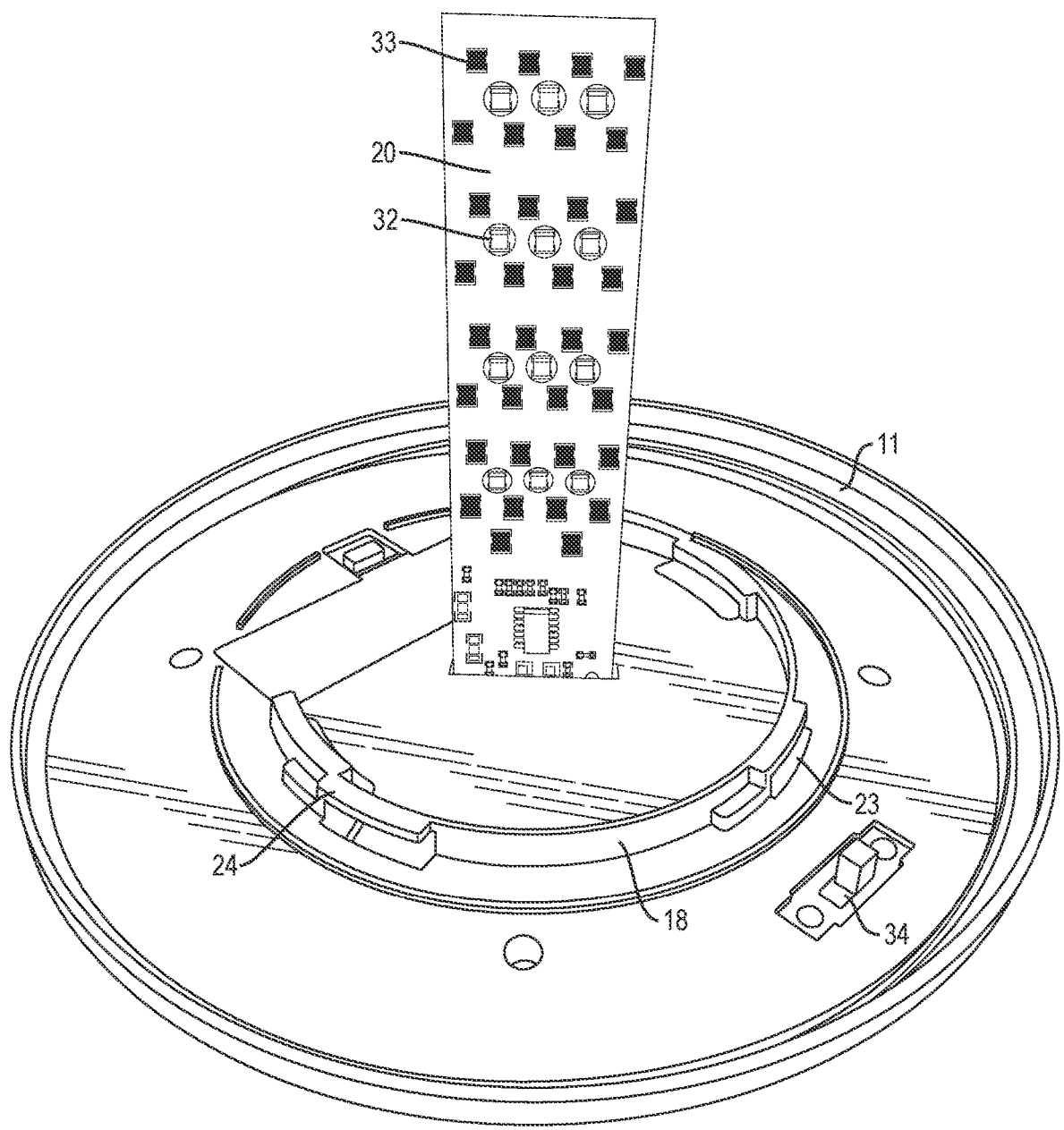
FIG. 4 is a view of the PCB mounted in the roof portion of the lamp unit with white LEDs illuminated according to an embodiment.
Figure 5:
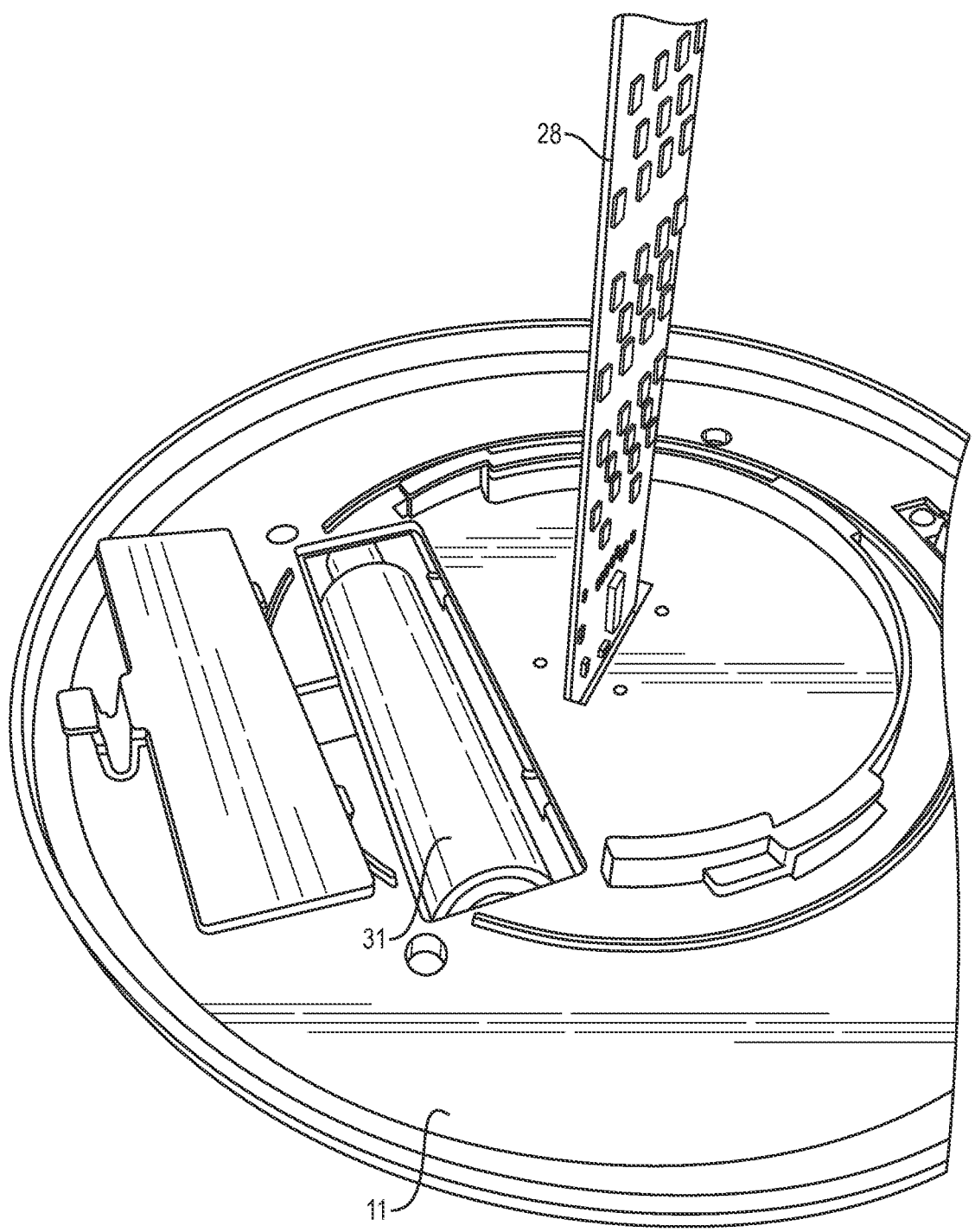
FIG. 5 is a view of the PCB mounted in the roof portion of the lamp unit and also showing a rechargeable battery housed in the roof portion, according to an embodiment.
Figure 6:
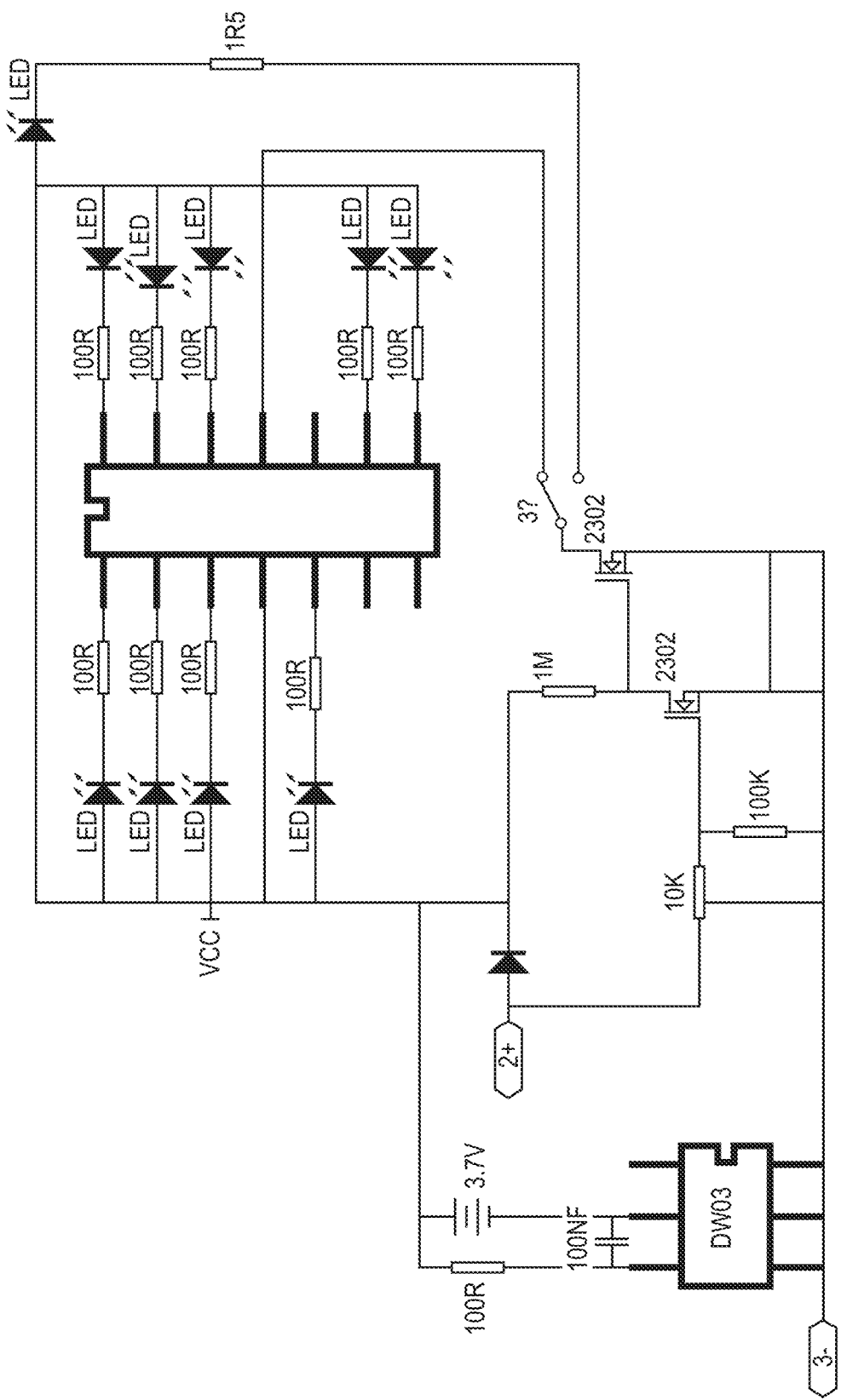
FIG. 6 is an electrical schematic diagram showing the configuration of the electrical components and LEDs listed in Table 1 according to an embodiment.
Figure 7:
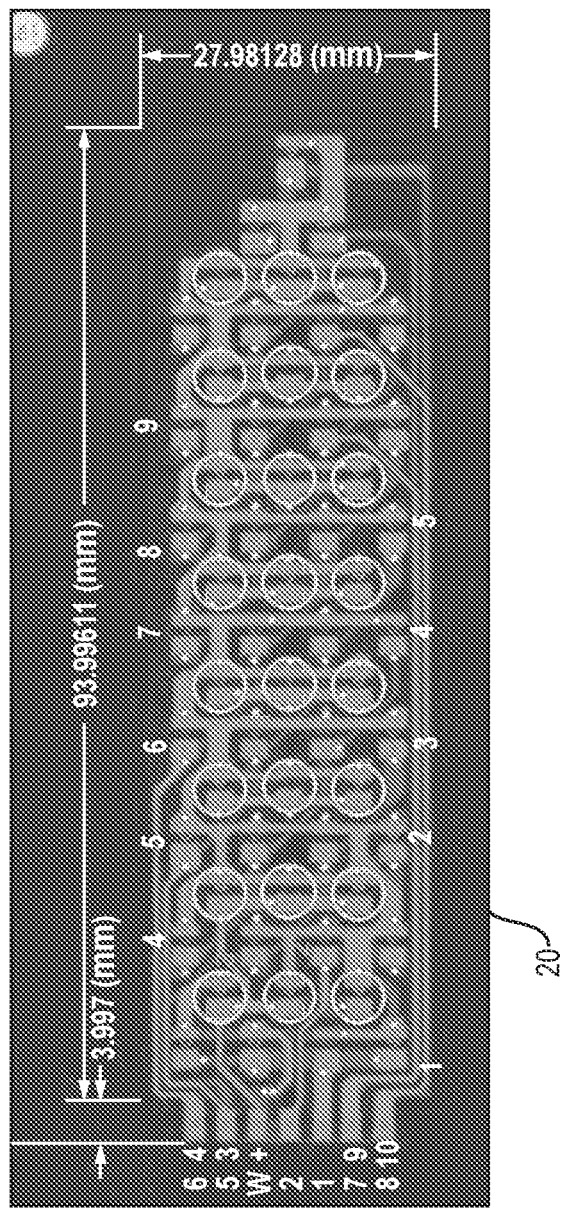
FIG. 7 is a view of the traces and dimensions of a main PCB according to an embodiment.

In the embodiment shown in FIGS. 1-10, each side of the PCB 20 has mounted thereon twelve white LEDs 32 arranged in four rows of three LEDs as shown for example in FIG. 4. Also, in the same embodiment, each side of the PCB 20 has mounted thereon thirty-two colored LEDs 33 arranged in rows of four, a pair of such rows disposed above and below each row of white LEDs, plus two additional colored LEDs are mounted on each side of the PCB at the top of the PCB (i.e., the end nearest the roof portion) as shown for example in FIG. 3. As shown for example in FIG. 3, the rows of colored LEDs 33 and rows of white LEDs 32 are interleaved. The LEDs are driven and controlled by an ASIC, custom, or programmable general purpose integrated circuit chip, for example, in the configuration shown in FIG. 6, utilizing the electrical components listed in Table 1, for example.

TABLE 1

| Description | Specification | Quantity |
| --- | --- | --- |
| PCB1 | | 1 |
| PCB2 | | 1 |
| IC Chip | WEN152-8(SOP14) | 1 |
| Battery protection chip | DW07D(SOT23-6) | 1 |
| Resistance | 100Ω | 10 |
| Resistance | 22Ω | 1 |
| Resistance | 100KΩ | 1 |
| Resistance | 2KΩ | 1 |
| Resistance | 1M Ω | 1 |
| Resistance | 1K Ω | 1 |
| Diode | S4(1206) | 1 |
| Capacitance | 100NF/0603 | 1 |
| Capacitance | 100UF/0603 | 1 |
| MOS | SOT23/2302 | 2 |
| LED | 2835 (flame LED) | 68 |
| LED | 2835 (white LED) | 24 |
| Switch | SS13D32G5 | 1 |
| Wire | 14CM | 2 |
| Wire | 10CM | 5 |

Figure 8:
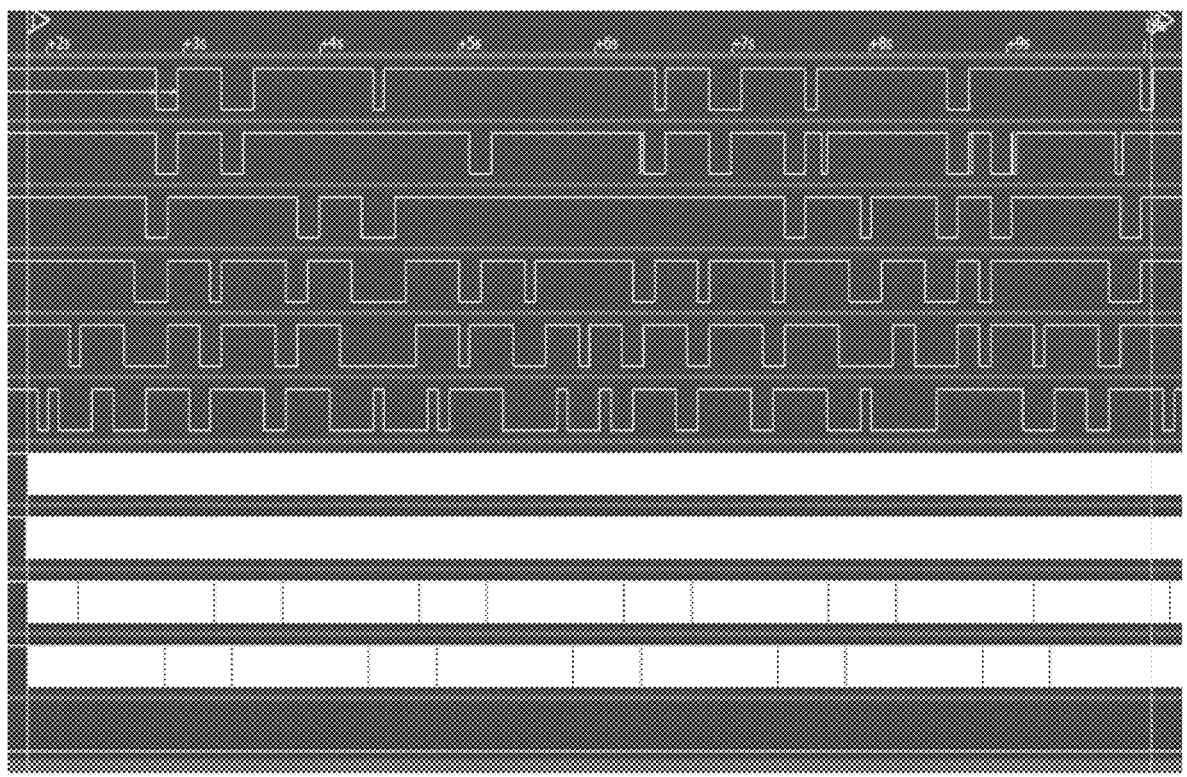
FIG. 8 is an electrical timing diagram showing an example of colored LED timing to create a flame effect according to an embodiment.

Preferably, the colored LEDs 33 (when turned on) are driven, and artfully turned on and off, by the control circuitry, to simulate a lantern flame burning within the enclosure 17. FIG. 8 is a non-limiting example of a timing diagram for the operation of rows of colored LEDs 33 which tends to simulate a flame. As can be seen in FIG. 8, different rows or different sets of LEDs 33 are operated on different duty cycles (i.e., the fraction of one period in which the row or set of colored LEDs 33 is powered on and illuminated). Preferably, some rows of colored LEDs 33 are lit up for most of the time (i.e., have a duty cycle of over 50%, over 60%, over 70%, over 80%, over 90%, or over 95%), while other rows are lit only intermittently (i.e., have a duty cycle of less than 50%, less than 40%, less than 30%, less than 20%, less than 10%, or less than 5%). Optionally, colored LEDs 33 in a given row may be lit at different times. The lighting pattern will more closely simulate a flame of a lamp if the lower rows of colored LEDs 33 are lit for longer periods of time than the upper rows, in the manner of a flame that burns steadily near the wick and flickers in the space above the wick. It should be understood that the lighting pattern will repeat on a loop until the colored LEDs 33 are turned off. Optionally, a random number generator, for which a pseudo-random output is sufficient for this purpose, may be configured in the control circuitry to vary the timing of selected rows of colored LEDs 33 during operation.

A rechargeable battery 31 is provided in the lamp 1 to power the LEDs 32, 33 and associated circuitry. The rechargeable battery 31 is preferably charged by a solar cell or cells 30, preferably positioned on the top of the roof portion 11 when installed. The solar cell or cells 31 may also be used as a light detector, so that the lamp 1 will illuminate only in low-light conditions. In that aspect of the subject technology, if the control circuitry detects sufficient voltage and/or charging current from the solar cells 31 to indicate that there is ambient light in the area of the lamp, enough to indicate that the conditions are not dark, the control circuitry will suppress the operation of the LEDs 32, 33 and not provide power to them; otherwise, the LEDs 32, 33 will be illuminated, or not, under the control of a user-activated switch 34. This feature enables unattended operation, which is desirable in a landscape light.

Figure 9:
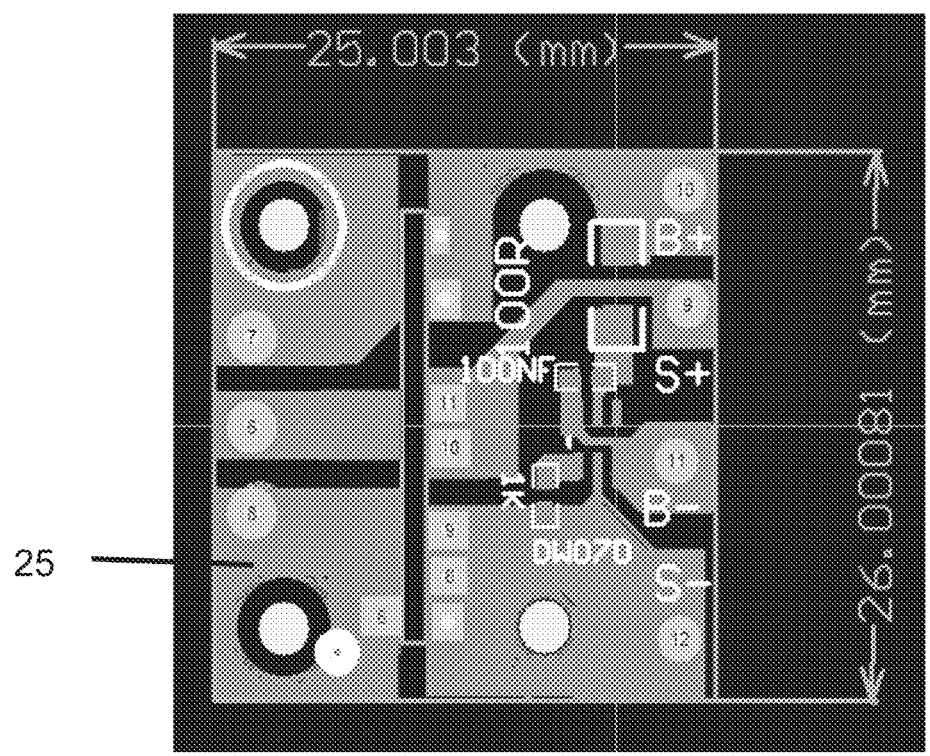
FIG. 9 is a view of the traces and dimensions of an auxiliary PCB according to an embodiment.
Figure 10:
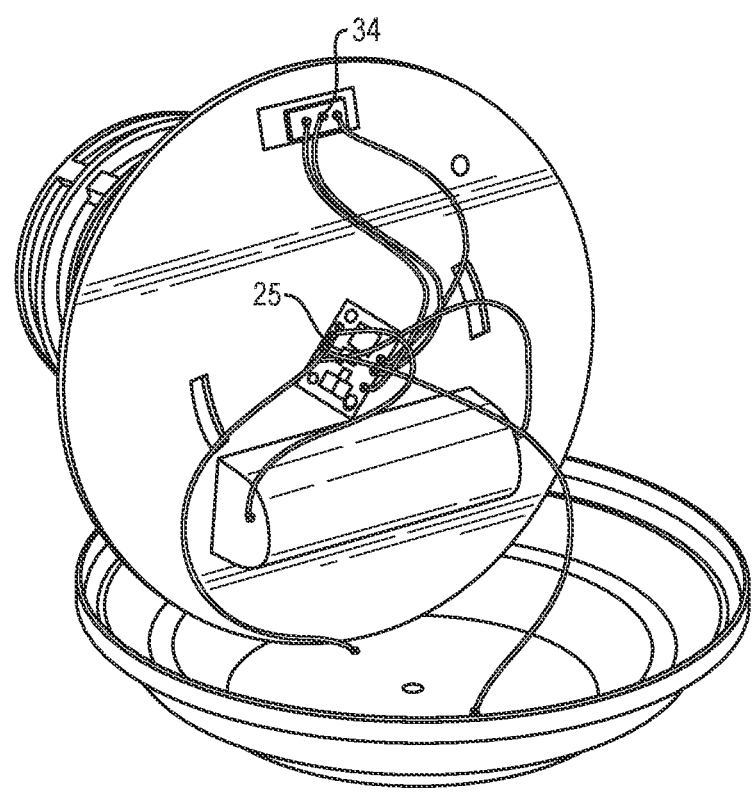
FIG. 10 is a view of the internal parts and wiring of the roof portion, including the auxiliary PCB, according to an embodiment.
Figure 11:
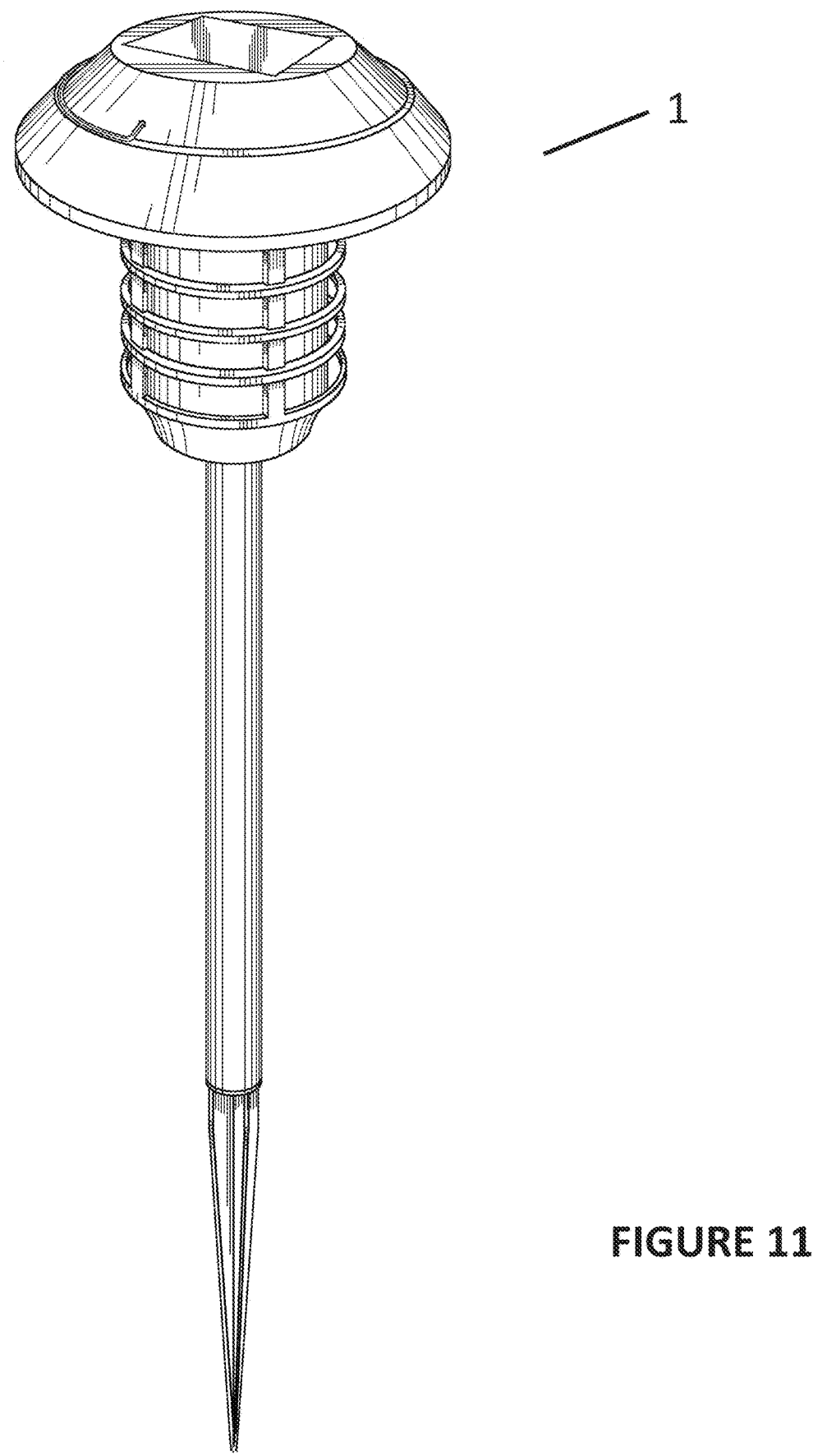
FIG. 11 is a front, left, top perspective view of a lamp according to an embodiment of the subject technology.
Figure 12:
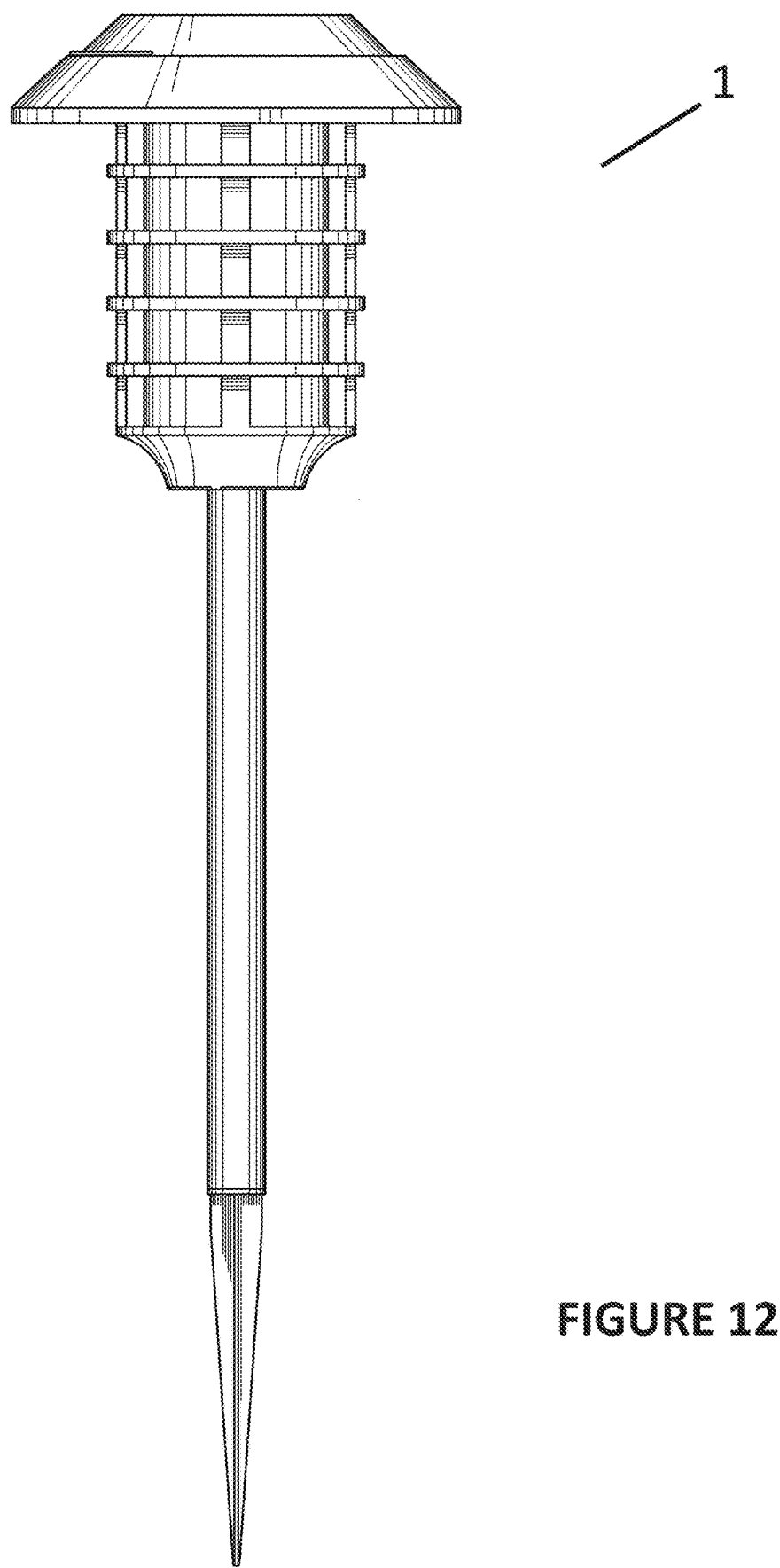
FIG. 12 is a front elevational view thereof.
Figure 13:
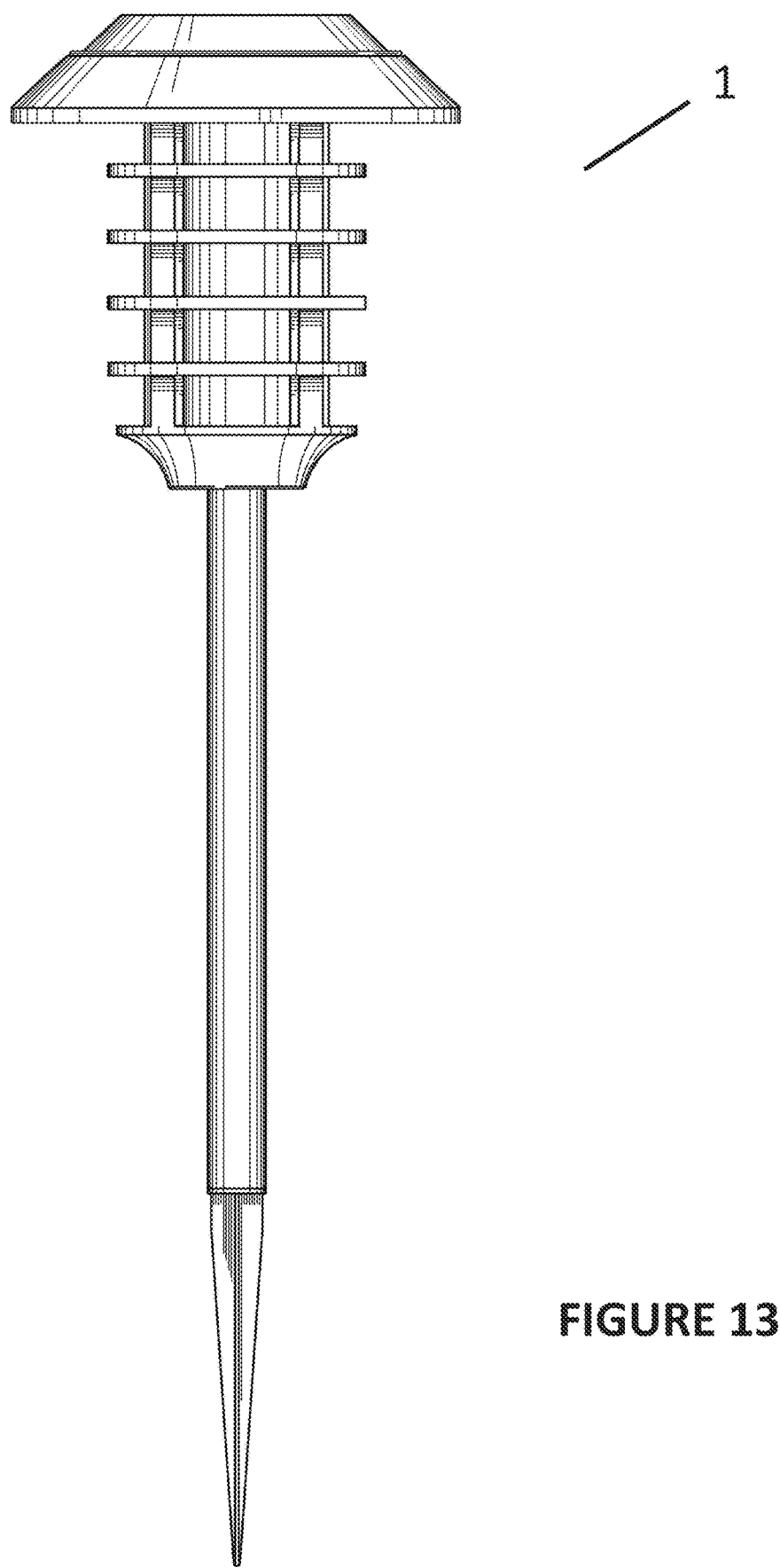
FIG. 13 is a side elevational view thereof.
Figure 14:
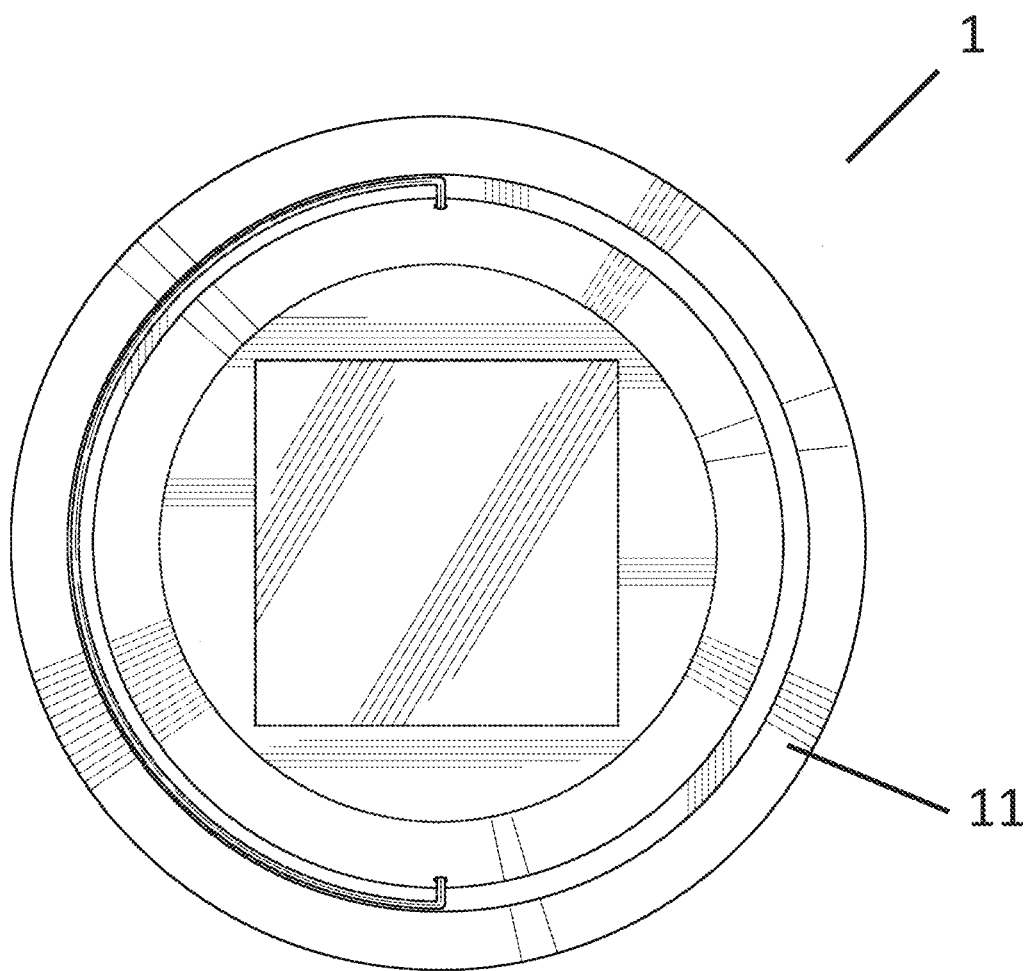
FIG. 14 is a top plan view thereof.
Figure 15:
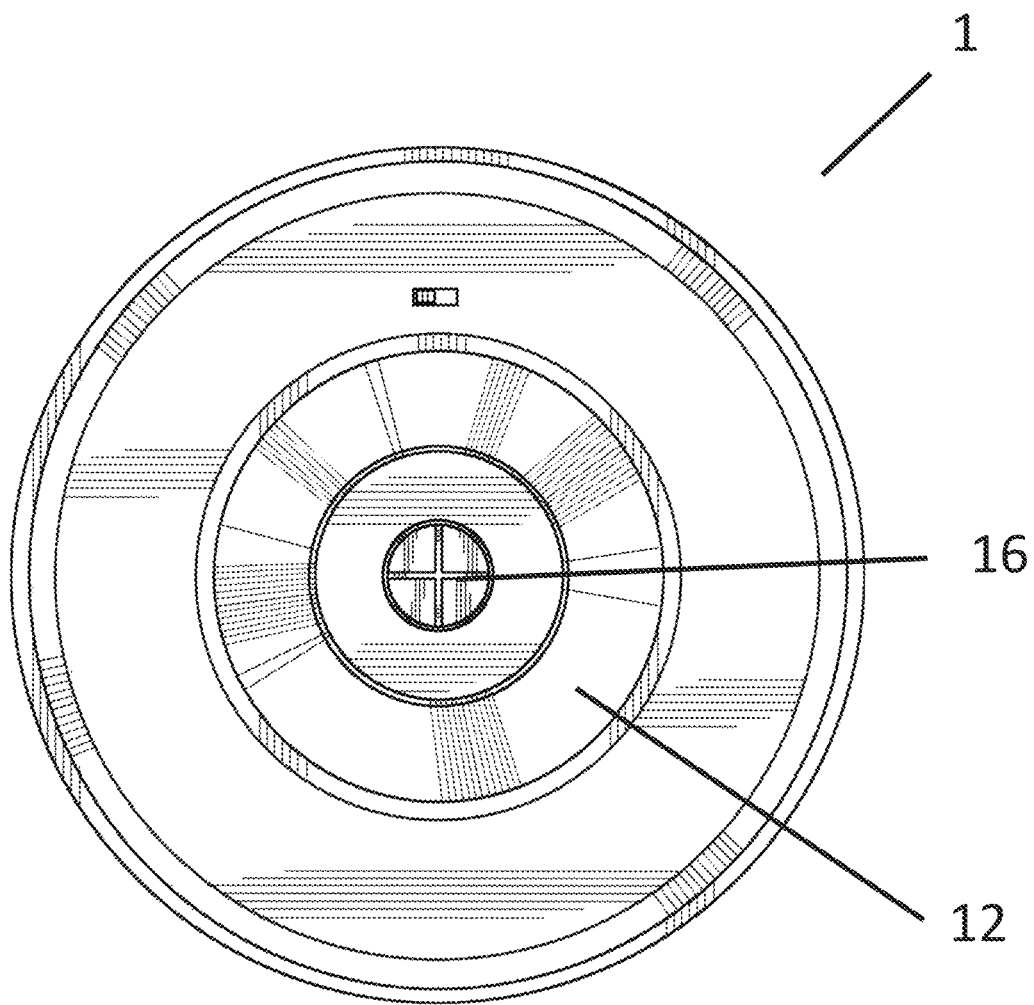
FIG. 15 is a bottom plan view thereof.

An auxiliary PCB 25, as shown for example in FIGS. 9 and 10, may be disposed and mounted in the roof portion 11. The main PCB 20 may have a tab engaging a slot in the auxiliary PCB 25 to further anchor the main PCB 20 in the roof portion 11. In the embodiment shown, the auxiliary PCB 25 is wired to the solar cell or cells 30, the user-operable switch 34, and the rechargeable battery 31, which are disposed within or on the roof portion 11, in the embodiment shown. The auxiliary PCB 25 is electrically connected to the traces of the main PCB 20 and provides a bridge between the main PCB 20 and the solar cell or cells 30, the user-operable switch 34, and the rechargeable battery 31.

User-operable switch 34 is provided and configured in conjunction with the driving circuitry to enable the user to select between a variety of operating modes. In an embodiment, the switch 34 is a three-position switch, and enables user choice of three modes: 1. All Off, 2. White LEDs On, 3. Colored LEDs On in Flame Pattern. In the same embodiment, the solar cells 30 have the function of a light sensor and the controlling circuitry will not power the LEDs 32, 33 if the solar cells 30 detect ambient light above a predetermined level. Other modes of operation may be provided. For example, a second user-operable switch may be provided to override the solar cells' detection of ambient light, so that the LEDs will operate in all ambient lighting conditions. In another example, two switches could independently turn the white LEDs on and the colored LED flame pattern on, so the user could select both to be on at the same time.

It will also be understood that the ornamental appearance of solar lamp as shown and described is within the scope of the subject technology.

Figure 16:
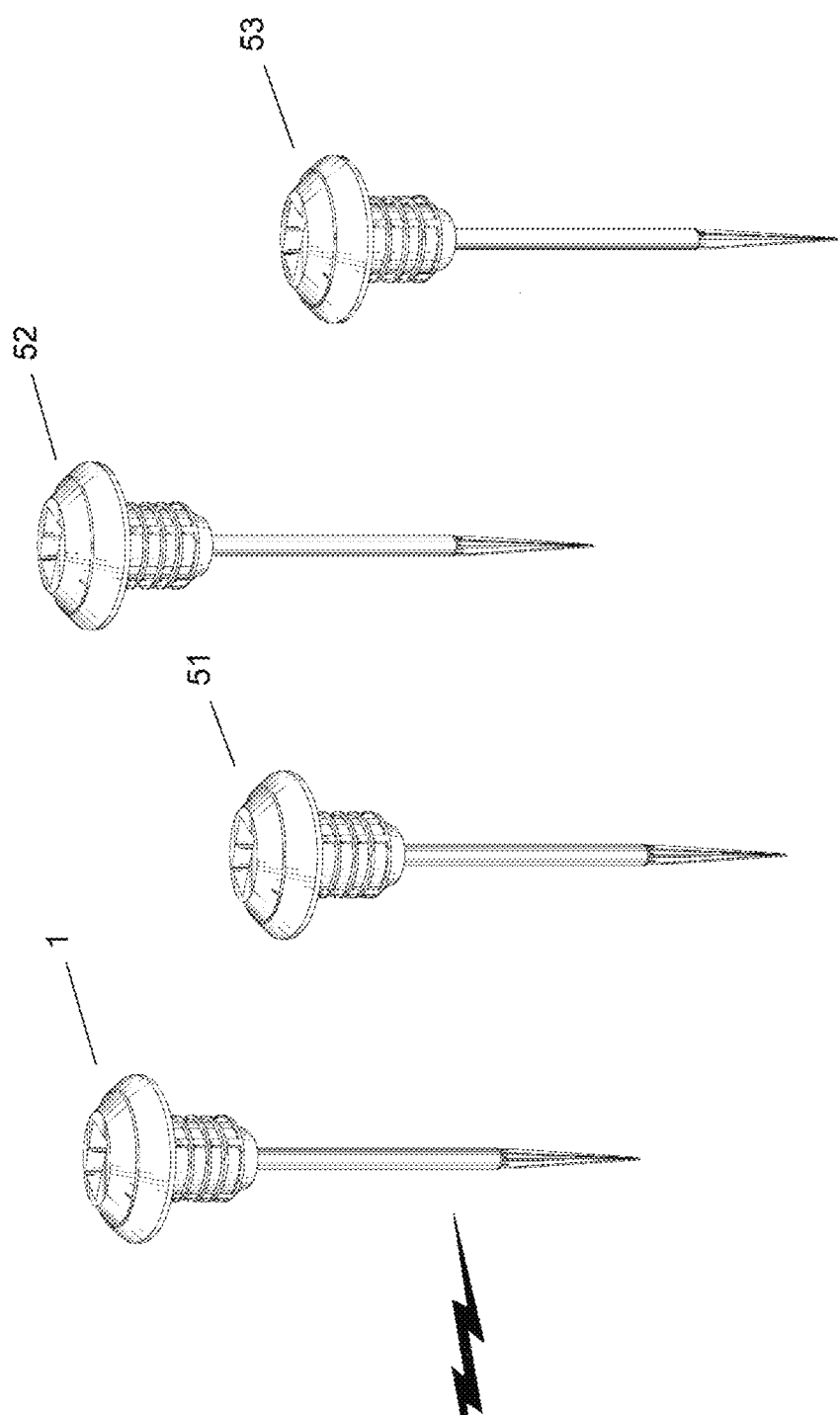
FIG. 16 is a schematic view of a set of lamps and a remote-control transmitter according to an embodiment of the subject technology.

In a further embodiment, best illustrated in FIG. 16, a remote-control transmitter 55 associated with lamp 1 and, optionally, additional lamps, for example lamps 51, 52, 53, having the same structure and function as lamp 1, are provided. In this embodiment, lamp 1 and, when present, lamps 51, 52, 53 preferably have a two-position manual switch, the switch having an ON position and an OFF position. When the switch is in the OFF position, the respective lamp is in an All Off mode and none of the LEDs are illuminated. When the switch is in the ON position, the lamp is a Receiving Mode and is responsive to commands received from the remote-control transmitter 55. For this purpose, in this embodiment, the electronic circuitry of lamps 1, 51, 52, 53 further includes a remote-control receiver, and the electronic circuitry is configured to, when in Receiving Mode, receive signals from the remote-control transmitter 55 and change operating modes of the lamp in response to the signals. The remote-control transmitter 55 and receiver may employ any suitable technology for transmitting and receiving remote-control signals, such as infrared and radio frequency, as non-limiting examples.

In this embodiment, control buttons for operating the remote-control transmitter 55 are disposed on the transmitter. In an embodiment, the buttons comprise an OFF button 56, an ON button 57, a FLAME button 58, and a BULB button 59, which, when pressed, send a corresponding remote-control signal to the receivers of lamps 1, 51, 52, 53, to the extent they are within the range of the transmitter, and the electronic circuitry responds by setting the operating mode of its respective lamp according to the button and signal. In an embodiment, the circuitry responds to the signals as follows: OFF button, All Off mode; FLAME button, Colored LEDs On in Flame Pattern and White LEDs Off mode; BULB button, White LEDs On and Colored LEDs Off mode; ON button, the most recently used mode of the previous two.

While specific embodiments of the invention have been shown and described in detail to illustrate the application of the principles of the invention, it will be understood that the invention may be embodied otherwise without departing from such principles. It will also be understood that the present invention includes any combination of the features and elements disclosed herein and any combination of equivalent features. The exemplary embodiments shown herein are presented for the purposes of illustration only and are not meant to limit the scope of the invention.

What is claimed is:

1. A lamp for illumination or decorative lighting comprising:
   a lamp unit comprising:
     a roof portion, and a base portion attached to the roof portion;
     a translucent cylindrical enclosure disposed within the lamp unit between the roof portion and the base portion;
     a single flat and rigid first circuit board disposed within the cylindrical enclosure and mounted to the roof portion or the base portion and having two faces;
     a white set of white LEDs for emitting white light, the white set mounted on the first circuit board and arranged in a plurality of white rows on each of the two faces;
     a colored set of colored LEDs for emitting colored light, the colored set mounted on the first circuit board and arranged in a plurality of colored rows on each of the two faces;
     the white rows interleaved with colored rows;
     a battery power source for the white LEDs and colored LEDs; and
     a user-operated switch and electronic circuitry for controlling and selectively powering from the battery the white LEDs and colored LEDs, the switch operable to select between an all-off mode and a receiving mode;
   the electronic circuitry configured to operate the lamp, when in the receiving mode, in a plurality of modes comprising an off mode, an illumination mode, and a flame mode;
   the electronic circuitry comprising a remote-control receiver for receiving remote-control signals from a remote-control transmitter, when the switch is selecting the receiving mode, and selecting between the off mode, the illumination mode, and the flame mode responsive to the signals from the remote-control transmitter;
   wherein when the off mode is selected the white set and colored set are off, when the illumination mode is selected the white set is powered on continuously and the colored set is off, when the flame mode is selected the colored LEDs of the colored set are powered on selectively by the electronic circuitry to simulate a flame.

2. The lamp of claim 1 further comprising solar cells on an outer surface of the roof portion and operably connected to the battery for charging the battery.

3. The lamp of claim 1 wherein when the flame mode is selected the white set is off.

4. The lamp of claim 1 wherein the user-operated switch is a three-position switch for selecting between the off mode, the illumination mode, and the flame mode.

5. The lamp of claim 1 wherein the lamp unit has the ornamental appearance of a lantern.

6. The lamp of claim 1 wherein the cylindrical enclosure has the ornamental appearance of the globe or chimney of a traditional lantern.

7. The lamp of claim 1 wherein:
the plurality of colored rows comprises a first colored row, a second colored row, and a third colored row;
the first colored row disposed near the base portion, the second colored row disposed between the first and second colored rows, and the third colored row disposed near the roof portion;
when the flame mode is selected, the first row is powered on for a first duty cycle, the second colored row is powered on for a second duty cycle, and the third colored row is powered on for a third duty cycle;
wherein the first duty cycle is greater than the second duty cycle, and the second duty cycle is greater than the third duty cycle.

8. The lamp of claim 1 wherein when the flame mode is selected, the colored LEDs are selectively powered on in a repeating pattern.

9. The lamp of claim 1 wherein when the flame mode is selected, the colored LEDs are selectively powered on in a predetermined pattern.

10. The lamp of claim 1 wherein when the flame mode is selected, the colored LEDs are selectively powered on in a random pattern.

11. A lamp kit comprising one or more lamps according to claim 1 and the remote-control transmitter configured to send remote-control signals to the remote-control receivers of the one or more lamps.

12. The lamp kit of claim 11 wherein the remote-control transmitter comprises user-operable buttons for causing the remote-control transmitter to send corresponding remote-control signals to the remote-control receivers of the one or more lamps, the buttons comprising an off button for selecting the off mode, a bulb button for selecting the illumination mode, a flame button for selecting the flame mode, and an on button for selecting the most recently used of the illumination mode and the flame mode.

* * * * *